Nov. 8, 1966     C. D. WILLSON     3,284,127
TRAILER DWELLINGS
Filed Dec. 18, 1963
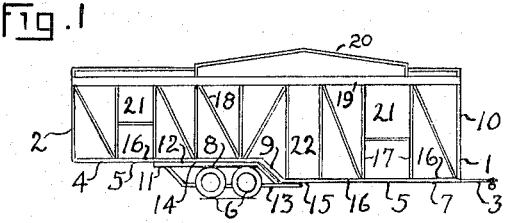
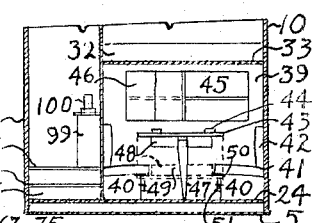
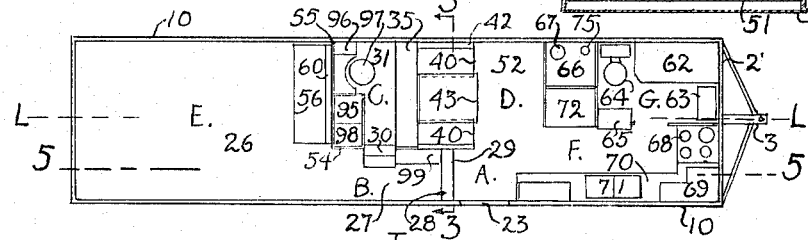
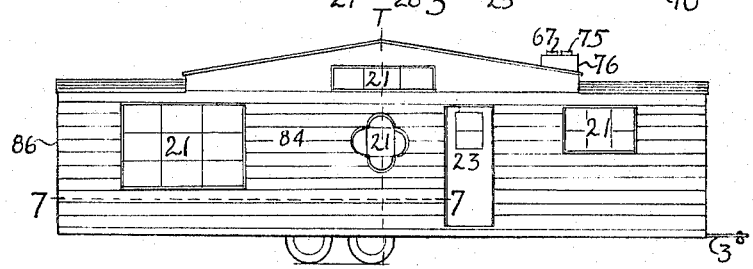
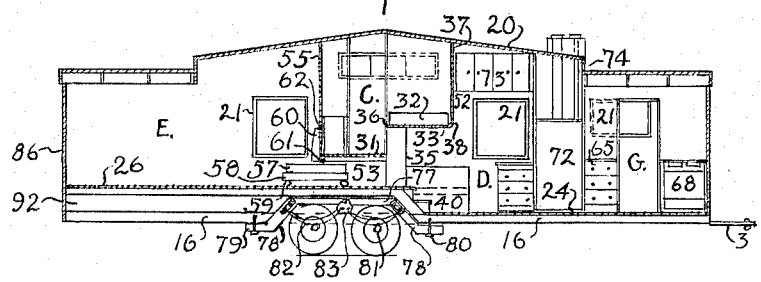
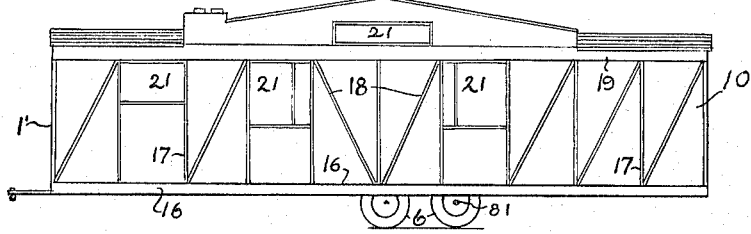
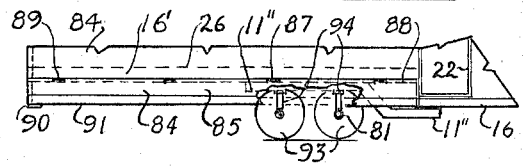
INVENTOR.
Corwin D. Willson

3,284,127
TRAILER DWELLINGS
Corwin D. Willson, Lake Orion, Mich.; Lou Temple Willson, executrix of said Corwin D. Willson, deceased
Filed Dec. 18, 1963, Ser. No. 331,438
13 Claims. (Cl. 296—23)

This invention relates to mobile dwellings having a staggered two-story body structure and, more particularly, to house trailers having opposite sidewalls bottomed in the same horizontal plane behind, alongside and ahead of roadwheels supporting the trailer bodies in highway transit, and more than half of the underside of the bodies extending well above that plane between said sidewalls. Since this structure is found in my co-pending application Ser. No. 249,938 filed Jan. 7, 1963 and a figure from the drawings of that application appears herein, this application constitutes a continuation-in-part of the co-pending application.

House trailers require a substantial amount of road clearance lacking in the unbroken series of applications beginning with my divided application Ser. No. 437,708 filed April 4, 1942 and each application describing a staggered two-story vehicular dwelling structure wherein an entrance door opens on a floor closest of several floors to ground level and ahead of and below the tops of roadwheels rearward of the lengthwise center of body load. In this series, both my Patents Nos. 2,577,836 and 2,743,955 show a floor across the back end at a level over the roadwheels, this floor serving as a landing between a flight of stairs rising to the floor of a bed chamber. In this chamber a bunkbed gives the body a unique structure, since the underside of the bunkbed provides a ceiling over a lower story body portion of story height and the chamber floor tops a body portion of less than story height housing a dinette. Every body in this series of applications was handicapped by a lack of sufficient road clearance to pass over R.R. tracks raised above the general level of the highway on opposite sides, or over rutted sideroads and similar obstacles. The primary object of this invention is a staggered two-story house trailer having means of greatly increasing road clearance while keeping the center of gravity low.

Prior art shows house trailers of limited floor area decreased by the upward protrusion of roadwheels above this area. In FIG. 1 of my last house trailer Patent No. 3,050,330, wheelwells for tandem pairs of roadwheels on opposite sides of the body protrude above the bottom floor area to create a bottleneck between opposite wheelwells. Current house trailer bodies may require three and even four roadwheels on each long side of the body and the upward protrusion of so many roadwheels above the bottom floor area became such a handicap that trailer builders began to perch the entire trailer body over the tops of the roadwheels—five risers above ground level and entrance doors. Most states compel roadwheels to be retained on permanently parked house trailer bodies and their building codes require any dwelling having an outside door three feet above ground level to be fitted with stairs and handrail rising to an outer landing. Some house trailers have as many as three outside doors and three such code-required landing, stairs and handrails alongside one trailer is not only unsightly, it is expensive and dangerous. Thus, another object of the invention is a staggered two-story house trailer that keeps the roadwheels spaced below the higher level aftlength of the body bottom floor and spaced behind and above the lower forelength of the body bottom floor whereby wheelwells are avoided, yet the center of gravity is kept low for a body higher than wide.

Another object of the invention is a house trailer body supported in highway transit by a substructure made up of a removable tow hitch and by a removable subframe on which all roadwheels have resilient mountings. In such States as permit removal of roadwheels, by making all but one of the factors on which the mobility of the body depends a demountable unit, the expense of roadwheels, tires, brakes, springs, axles and hitch—the entire running gear—may be held down to a modest payment to a haulage company for the use of these essentials by a house trailer owner only on the rare occasions when the mobility of his dwelling becomes advantageous to him.

Another object of the invention is a house trailer body wherein the lengthwise stiffening is less in a costly chassis than in beams in upper opposite sides of the body and extending closely below gables therein.

Another object of the invention is a house trailer having a structure whereby two non-sleeping rooms are easily converted into sleeping rooms privately accessible to the bathroom, a vertically shallow enclosure being topped by a chamber floor storing a bed rollable into the largest room and a composite bed being made up of dinette components seating several passengers under a bunkbed in the one fixed bed chamber.

Another object of the invention is an entrance vestibule at one end of a hallway that extends along an outer sidewall of a house trailer body, the hallway being bottomed at several different levels next to the body bottom.

These and other novel features and objects of the invention are hereinafter more fully described and claimed and the prefered form of my house trailer combining these features is shown in the accompanying drawings, in which:

FIG. 1 from the co-pending application shows the superstructure and substructure supporting the house trailer body in highway transit.

FIG. 2 is a floor plan of my house trailer body.

FIG. 3 is a transverse section taken on line 3—3 of FIG. 2.

FIG. 4 is a side view of body of FIG. 2, less windows in openings.

FIG. 5 is a longitudinal section taken on line 5—5 of FIG. 2.

FIG. 6 is a view of the opposite side of the body of FIG. 2 with the outer covering of FIG. 4 removed to show the body-stiffening frame.

FIG. 7 is a detail of the body taken below line 7—7 of FIG. 4.

In the drawings, FIG. 1 shows the unit framework 1 of a house trailer body 2 having demountable tow-hitch 3 projecting ahead of the front end of the body, the higher level aftlength 4 of the body bottom 5 extending over and closely ahead of roadwheels 6 and the lower level forelength 7 of body bottom 5 being below the tops 8 of roadwheels 6 and aftlength 4 and forelength 7 being connected by abruptly downward extending midlength 9 of body bottom 5. Framework 1 is shown uncovered and it will be understood that opposite outer sidewalls 10 are similarly framed. Roadwheels 6 are mounted tandem on opposite sides of subframe 11 which has a higher-level aftlength 12 and a lower-level forelength 13. The topside of aftlength 12 fits snugly up against the underside 14 of body aftlength 4 and the topside of subframe forelength 13 fits smugly up against the underside 15 of body forelength 7. Subframe 11 extends under such lengthwise and crosswise stiffening members as body bottom 5 has and which may be members of a chassis frame or include opposite sills 16. To prevent harmful lengthwise deflections in a body from four to more than five times longer than wide, vertical studs 17 and diagonal braces 18 distribute upward thrust of body load on subframe 11 and towhitch 3 in highway transit over widely spaced portions of the beam-like main lengthwise body-stiffening members 19 spaced nearer the top than the bottom of framework 1. Gable frames 20 extend in opposite sidewalls 10 above beams 19 and window openings 21 and door openings 22 are framed by studs 17 extending between sills 16 and beams 19. FIG. 1 is structurally typical but not identical with other figures herein.

FIG. 2 shows the floor plan of body 2' having entrance door 23 opening on Vestibule A bottomed by floor 24 that extends across body 2' ahead of roadwheels 6 and constitutes the topside of entire forelength 7 of body bottom 5 below the level of tops 8 of roadwheels 6. Vestibule A constitutes the lower end of Hallway B which, next to outer sidewall 10, extends up a number of risers 25 to another floor 26 which constitutes the topside of entire aftlength 4 of body bottom 5, floor 26 extending from one sidewall 10 to the opposite sidewall 10 at one level closely over the tops of roadwheels 6. That part 27 of floor 26 in Hallway B constitutes a landing between stairs 28 that includes tread 29 between risers 25 and stairs 30 rising to floor 31 of Chamber C wherein, alongside but well above floor 31, mattress 32 on bed platform 33 make up a legless bunkbed 34. Top of storage wall 35 is next to and supports the aftside 36 of platform 33, and transverse wall 37 rises from the foreside 38 of platform 33 to the top of gable 20 which, in Chamber C rises to story height above floor 31. As used herein, "story height" will be understood to mean a height above a floor exceeding the standing height of a tall human male of mature growth. Bed 34 extends lengthwise athwart the lengthwise center axis L—L and bed platform 33 tops a body portion 39 of less than story height in Dining Room D wherein floor 24 supports seats 40 having soft bottom cushions 41 and soft seat-backs 42 facing hard-topped tabletop 43 secured by fasteners 44 to the foreside of transverse storage wall 35 housing china cupboard 45 openable by closure 46. Side of tabletop 43 opposite storage wall 35 is supported by leg 47 and tabletop 43 has a soft underside 48 which, when tabletop 43 is released from wall 35 and leg 47 from tabletop 43, may be fitted soft side up, as in FIG. 3, between and flush with bottom cushions 41 to make up a soft-topped berth 49. Tabletop 43 is caught in rabbets 50 in seats 40 by the turning of cleats 51. Together, seats 40 and tabletop 43 make up a dinette walled in part by midlength 9 of body bottom 5 and composite bed 49, made up from dinette components exclusive of seat-backs 42, is in a corner formed between floor 24, mid-length 9 and outer sidewall 10, and bed 49 extends lengthwise athwart axis L—L and below floor 26. Body portion 39 housing composite bed 49 is separated from Chamber C by storage wall 35 and the story-high part 52 of Dining Room D is separated from Chamber C by wall 37. Around the three sides of tabletop 43 not attached to storage wall 35 may be seated six adults.

Back of transverse wall 35, floor 26 extends spaced under floor 31 and floors 31 and 26 top and bottom a vertically shallow enclosure 53 enclosed on three vertical sides by an outer sidewall 10, by storage wall 35 and by inner wall 54 of Hallway B. Transverse wall 55 extends from top of gable frame 20 down to top of enclosure 53 and between Chamber C and Living Lounge E, the largest room in body 2'. The fourth vertical side of enclosure 53 below wall 55 is open and opens on Lounge E. The enclosure 53 houses a roll-away bed 56 consisting of mattress 57 flatly supported on legless four-cornered frame 58 having castors 59 at the four corners thereof. In FIG. 5, bed 56 is shown half in and half out of enclosure 53 to make up a davenport in Living Lounge E and having a soft-faced, hard-backed seatback 60 secured to wall 55 by hinges 61. When bed 56 is rolled on floor 26 wholly into enclosure 53, the release of fastener 62 permits seatback 60 to be swung out and down on hinges 61 to close enclosure 53 with the hard side of seatback 60. Bed 56 may be made up ready for use and rolled into Lounge E as occasion demands. In a house trailer having only one fixed bedroom, two more sleeping rooms are quickly made up and access to the bathroom is by way of the Kitchenette F to the occupants of three difference kinds of beds, each in a separate room. This structure leaves the Living Lounge E unemcumbered with activities concentrated in the lower-level service end of body 2'. Thus in a house-trailer much shorter than the two bedroom house trailers now available, the essentials of three sleeping rooms, each with private access to the bathroom, are economically available. For greater clarity, the three body portions of less than story height comprising, (a) that directly above bed platform 33, (b) body portion 39, and (c) enclosure 53, may be referred to collectively as alcoves, or as bed alcoves herein.

By "service-end" of the body is meant the fore end above floor 24 where are concentrated entrance Vestibule A, Dining Room D, Kitchenette F and Bathroom G. In Bathroom G are tub 62, lavatory 63, toilet stool 64 and linen cabinet 65 opening also in kitchenette F. Between Bathroom G and Dining Room D is space heater 66 having exhaust pipe 67. In Kitchen F are cookstove 68, cupboards 69, dresser worktop 70, sink 71 and refrigerator 72. Gable height provides cupboards 73 above window opening 21 in Dining Room D and ventilator fan outlet 74 at top of Kitchen F. Plumbing stack 75 and exhaust pipe 67 both are housed in chimney 76 which has one side coextensive with gable sidewall 10.

As seen in FIG. 5, subframe 11' is made up of a top midmember 77 between abruptly downward slanting fore and aft members 78 which, at their lower ends have receivers 79 extending under and secured by fasteners 80 to sills 16 on opposite sides of lengthwise center axis T—T, sills 16 extending continuously in one horizontal plane from one end to the opposite end of body 2'. Roadwheels 6 turn on axles 81 which are shackled to leaf-springs 82 each having one end supported by one of members 78 of subframe 11' and the opposite end supported by equalizer 83 pivoting on midmember 77 of subframe 11'. Though not shown, it will be understood that roadwheels 6 have brakedrums housing brakes remotely controlled from the vehicle attached to hitch 3 in ways old in the art.

FIG. 6 shows sidewall 10 opposite to that of FIG. 4 with outer covering or facing 84 removed to show principal members of framework 1' which is alike in both long sides 10 except for differences in closures 21 and 22. In FIG. 6, sills 16 extend in the outer perimeter of the body bottom from one end of the body to the opposite end thereof in the same horizontal plane and continuously therein. Floor structure 26 may extend along the inner sides of opposite sidewalls 10 at a higher level than the bottoms of opposite sidewalls 10. While floor structure 24 remains in the same horizontal plane as sill 16, floor structure 26 may extend from one to three risers 25 above the bottom of sills 16 and over and behind the tops of roadwheels 6 at a single level.

FIG. 7 shows rearward of door opening 22, floor structure 26 and sills 16' coinciding on opposite sides of body 2', and long horizontal sections 85 of opposite sidewalls 10 and rear endwall 86 may consist of lengthwise rigid panels 85 having upper edges 87 fitting into a continuous rebate 88 in the outer bottoms of higher level sills 16' making up aftlength 4 of body 2'. Panels 85 are secured at their upper edges 67 to body 2' by the upper flaps of spaced hinges 89 of the removable pin type. Panels 85 in FIG. 7 are twelve times longer than high and may be faced with the same type of material 84 as the rest of body 2' sidewalls and endwalls so that the appearance outwardly is that of FIG. 4. Where panels 85 abut endwise, fasteners 90 latch bottom edges 91 of panels 85 securely together. Unlatching fasteners 90 permits the bottom edges 91 to be swung on hinges 89 outward and upward above upper edges 87 to make the body underspace 92 alongside panels 85 manually accessible to a person outwise body underspace 92. Removal of pins from hinges 89 permits removal of panels 85 from body 2' where road clearance over rough roads or meadows needs to be substantially increased.

Many communities require house trailers not to remove running gear. Roadwheels having pneumatic tires and brakes would be harmed if let into the earth in localities where the earth remains damp for long periods, but FIG. 7 shows solid wheels 93 substituted at a permanent parking site for roadwheels 6 and blocks 94 hinged to subframe 11" or body 2' and interposed between subframe 11" and or body 2' and axles 81 to block body 2' off springs 82, whereupon composite wheels 93 may be let down into the permanent site slightly to bring the entire body 2' one riser closer to ground level and even the slight lodgement of wheels 93 in the parking site, without legally attaching the body 2' to the site, would make less common an accident that leads to the combustion of house trailers and even to the death of their occupants—the upsetting of the house trailer by a strong wind.

In FIG. 4, roadwheels 6 are tandem mounted and lengthwise center line T—T passes ahead of axles 81. In consequence of the concentration next to floor 24 of the heavier components, such as plumbing accessories, space heater, cook-stove, refrigerator, dinette components and the like, body 2' has a low center of gravity in highway transit for a body higher than wide. The preponderance of weight, herein called body load, is ahead of line T—T, so that roadwheels 6 may be said to be positioned behind the lengthwise center of body load.

It should be bourne in mind that regulations governing the relation of house trailers and mobile dwellings to the land they occupy is presently in a state of the flux and that this invention aims at adaptations to whatever regulations prevail: as to whether roadwheels may be removed from the body or must be retained, whether body blocking on a permanent site in localities which compel the retention of the running gear, may permit substitute wheels of concrete "let down" into the site as here described. A mass-produced house trailer built to be conveyed into any state or locality must prepared to meet regulations greatly differing in these respects.

On improved roads, body 2' has sufficient road clearance to have the outer bottom perimeter extend fixedly in a single horizontal plane and without interrupting continuously around the body. Where body 2' has to pass over roads requiring maximum road clearance, the structure of FIG. 7 will be advantageous. The present manner of conveying house trailers perched three feet in the air over the tops of their roadwheels to avoid wheelwells protruding into the limited floor area not only is attended with the disadvantages already pointed out, but it rules out completely the staggered two-story house trailer I have spent so many years improving and the great weakness of which was that it had too little road clearance to go where many trailers have to go. By means of the structure herein described, this weakness has been overcome while retaining the low center of gravity a staggered two-story, tri-level body higher than wide requires for safety in highway transit.

Body 2' has a ratio of length to width of four to one—40' long and 10' wide. By increasing this ratio to five to one, the added space may be shared by the Living Lounge E, Chamber C and Dining Room D and more closets may be added, while retaining those features which achieves a two-story house trailer with plenty of road clearance and low center of gravity over uneven terrain. Unlike present house trailers, here Living Lounge E is well separated from the service end of body 2' and Chamber C has a clothes closet 95, a dresser 96, and an easy chair 97. Closet 95 extends at the back and over the top of wrap closet 98 accessible from floor 26 and cabinet 99 holds rubbers and telephone 100.

From this description, it is apparent that this invention achieves a new and novel synthesis of features embodied in my unbroken series of applications going back to 1942 and describing—in retrospect—a staggered two-story house trailer that achieves what my previous structures lacked—adequate road clearance and story height in all rooms within the limits of overall height that underpasses restrict. The push of urbanization crowds millions of American families in increasingly unhealthy, crime-ridden, smog-shrouded environments where the ultraviolet needed for human health cannot penetrate even when the sun appears to shine. Traffic snarls increase on streets devised for horsedrawn vehicles and ancient apartments are cut up into cubicles good only for those who profit from dangerous overcrowding. What too few thoughtful men seem to realize is that such facts reveal the anachronism of handicraft and land-rooted concepts in a country that is called a "nation on wheels." By its potential mobility, the house trailer may go or stay and is adapted to utilize the systemmatized methods of industrial production. Here, in a body having a ground area no greater than that of a two-car garage, the invention achieves a dwelling wherein three rooms may, on occasion, serve as bedrooms each having private access to the bathroom—a dwelling not perched three feet in the air, but supported on roadweels having much of their upper halves hidden between the one-level bottom outside perimeter of the body which easily may be made to be close to or may coincide with ground level.

The drawings, being illustrative only, are more or less diagrammatic in character to show the preferred relationship of the parts to the whole, and it may be observed that changes in certain parts may be made without vitally altering the character of the whole or departing from the spirit and scope of the invention as set forth in the appended claims; and it will be understood that any of the variants and modifications in the structure of my house trailer or mobile dwelling may be used separately and in any desired combination, and that all changes which come within the meaning and range of equivalency of the claims are therefore intended to be embraced therein.

Having thus broadly defined and fully described my invention, its structure, the manner of achieving lengthwise stiffness, of increasing the limited floor area and the road clearance while keeping the center of gravity low for safe passage over uneven ground for a body higher than wide, what I claim and desire to secure by Letters Patent of the United States is:

1. A dwelling comprising a vehicle body on ground support and enclosing a housekeeping suite of rooms of story height, said body having a transverse partition wall near the lengthwise center of the body and two alcoves of less than story height fixed back to back against opposite sides of said wall: the forward of said alcoves forwardly opening on one of said rooms, and the rearward of said alcoves rearwardly opening on another of said rooms and having a bottom of substantially higher level than the bottom of said forward alcove, and said ground support comprising roadwheels of which one is spaced closely below said bottom of said rearward alcove and closely behind to extend above said bottom of said forward alcove.

2. A vehicle body on ground support and having a transverse partition wall and three rooms each of story height and three alcoves of less than story height and each alcove opening well athwart the lengthwise center axis of the body on a different one of said rooms; the first and second of said alcoves being back-to-back against said transverse wall and the third of said alcoves having a bottom member at the top of said wall, and the bottom of said second alcove extending athwart said axis at a substantially higher level than the bottom of said first alcove, and said ground support in transit comprising roadwheels including one roadwheel spaced closely below said bottom of said second alcove and closely behind and extending above said bottom of said first alcove.

3. A vehicle body including opposite endwalls, opposite sidewalls, an inner transverse partition wall abutting a lengthwise midpart of one of said sidewalls, and a bottomwall having two lengths of different levels, a first of said lengths ahead of said partition wall being at a substantially lower level than the second of said lengths behind said partition wall; and said body housing two rooms of story height, and two alcoves next to said partition wall: both said alcoves being of less than story height and a first of said alcoves forwardly opening on a first of said rooms and housing a dining table having a top demountably secured to the forward side of said partition wall, and the second of said alcoves housing a bed and rearwardly opening on the second of said rooms; and the bottoms of said opposite sidewalls extending both ahead of and behind said partion at one general level, and lower portions of said opposite sidewalls and the aft one of said endwalls, below said second length of said bottom wall of higher level, having means of being displaced to increase the bottom clearance of said body rearward of said partition wall in passage over substantially uneven ground.

4. A vehicle body including a sidewall thereof and a bottom wall extending from one end of the body to the opposite end at two substantially different lengthwise levels, the interior of the body having two rooms each of story height next to said sidewall and two alcoves of less than story height next to said sidewall, the first of said alcoves housing a dinette table and forwardly opening on a first of said rooms next to the lower-level length of said bottomwall, and the second of said alcoves housing a bunkbed and rearwardly opening on the second of said rooms above the higher level length of said bottomwall, and the bottom of said bunkbed topping said first alcove to give said second room and second alcove a staggered two-story relation with said first room and first alcove.

5. A vehicle body having from end to end a bottomwall including a lower-level forelength and a higher-level aftlength, said body enclosing all sides of a suite of rooms of story height and two alcoves of less than story height, and a transverse partition wall of the body backing a first of said alcoves next to the second of said alcoves, and said first alcove forwardly opening along said lower-level forelength on a first of said rooms and said second alcove rearwardly opening on the second of said rooms above said higher-level aftlength of said bottom wall and a midlength of said bottomwall extending abruptly down from said aftlength to said forelength of said bottom wall along one side of said first alcove.

6. The structure of claim 5 wherein said body includes opposite sidewalls having bottom margins continuously extending alongside, ahead of, and behind said midlength at a general level substantially below the underside of said aftlength of the bottomwall.

7. The structure of claim 5 wherein said midlength extends ahead of the lengthwise center of the body and in-transit ground support for said body comprises axle-mounted roadwheels having resilient tires spaced closely below said aftlength of said bottomwall and closely behind said midlength side of said first alcove and, when said body is lastingly parked on a dwelling site off said roadwheels, ground support for said body comprises rigid composition substitutes for said roadwheels and tires and said substitutes let down into said site to brace said body against overturn by high winds.

8. The structure of claim 5 wherein ground support for said body in transit comprises roadwheels between opposite sidewalls of the body and spaced behind and extending above the bottom of said first alcove and a pair of said roadwheels turns on axle ends having resilient mountings and a subframe supports said mountings, and fasteners secure said subframe snugly up against said aftlength and said midlength and said lower-level forelength of said bottomwall, and removal of said fasteners permits said subframe, said resilient mountings, said axle ends and said roadwheels to be removed from said body as a unit.

9. The structure of claim 5 wherein said body includes opposite sidewalls and a topwall and beams extend lengthwise of the body in said sidewalls near said topwall and sills bottom said sidewalls, and ground support for said body in transit comprises a front towhitch and roadwheels having tires spaced closely below said aftlength and behind said first alcove, and said sills are supported in transit by said roadwheels and said towhitch, and upright members are spaced in said opposite sidewalls to upwardly diffuse body load concentrated on said sills directly and obliquely upward into and along said beams, which have a greater depth and longitudinal stiffness than said sills.

10. A dwelling comprising a road vehicle body of greater width than presently allowed common passage on public highways without special permit, the body having opposite sidewalls and bottomwall and housing a housekeeping suite of several rooms of story height including an entrance hallway next to only one of said sidewalls and opening at different levels on three of said rooms, and three alcoves each of less than story height and opening on a different one of said three rooms, said three rooms and said three alcoves being walled by one of said sidewalls opposite said entrance hallway, and a first of said three rooms and a first of said alcoves forwardly opening on said first room being bottomed at a lower level by said bottomwall, and a second of said three rooms and a second of said alcoves rearwardly opening on said second room being bottomed at a higher level by said bottomwall, and the third of said three rooms and a third of said alcoves rearwardly opening on said third room being bottomed by the staggered tops of said first and second alcoves, and a transverse storage wall extending from said bottomwall up between said said first and second alcoves to the underside of said third alcove.

11. The structure of claim 10 wherein said storage wall houses a china cupboard having an opening on said first alcove and said first alcove houses bed components convertible to make up a tabletop demountably secured to said storage wall below said china cupboard opening.

12. The structure of claim 10 wherein a transverse partition wall separates said second and third rooms and said second room houses a davenport having a hard backed back cushion operatively secured to said partition wall, and the lower portion of said davenport has means of being freely rolled independent of said back cushion fully into said second room to comprise a bed therein or freely rolled fully out of said second room for storage in said second alcove, whereupon said back cushion may be outwardly and downwardly swung to wholly close said second alcove below said partition wall with said hard back of said back cushion.

13. The structure of claim 10 wherein said staggered tops of said first and second alcoves comprise a floor athwart the lengthwise center axis of the body over the vertically shallower second alcove and a bed platform over said first alcove and alongside and well above said floor, and said bed platform comprises the underside of a legless bunkbed in said third alcove and lengthwise accessible from said floor.

(References on following page)

References Cited by the Examiner

UNITED STATES PATENTS

| | | | |
|---|---|---|---|
| D. 170,093 | 7/1953 | Poole | 296—23 X |
| 1,973,030 | 9/1934 | Webber. | |
| 2,268,167 | 12/1941 | Raine | 280—80 |
| 2,277,616 | 3/1942 | Townsend | 280—106 |
| 2,527,012 | 10/1950 | Kinsman | 296—23 X |
| 2,563,917 | 8/1951 | Caesar. | |
| 2,589,894 | 3/1952 | Ten Eyck | 296—23 |
| 2,618,493 | 11/1952 | Fransen | 296—23 X |
| 2,803,855 | 8/1957 | Suter | 20—1.11 |
| 2,941,836 | 6/1960 | Lewis | 296—23 |
| 3,058,769 | 10/1962 | Willson | 296—23 |

FOREIGN PATENTS 566,120  12/1944  Great Britain.

BENJAMIN HERSH, *Primary Examiner.*

A. HARRY LEVY, *Examiner.*

P. GOODMAN, *Assistant Examiner.*